United States Patent
Alcock et al.

(10) Patent No.: US 7,545,589 B2
(45) Date of Patent: Jun. 9, 2009

(54) OPTICAL ASSEMBLY

(75) Inventors: Ian Peter Alcock, Petersfield (GB); David James Pointer, Southampton (GB)

(73) Assignee: Point Source Limited, Southampton (GB)

( * ) Notice: Subject to any disclaimer, the term of this patent is extended or adjusted under 35 U.S.C. 154(b) by 318 days.

(21) Appl. No.: 11/456,971

(22) Filed: Jul. 12, 2006

(65) Prior Publication Data
US 2007/0019907 A1    Jan. 25, 2007

(30) Foreign Application Priority Data
Jul. 14, 2005    (GB)    ................................. 0514493.6

(51) Int. Cl.
*G02B 7/02* (2006.01)
(52) U.S. Cl. ....................................... 359/819; 359/811
(58) Field of Classification Search .................. 359/819
See application file for complete search history.

(56) References Cited

U.S. PATENT DOCUMENTS

| | | | |
|---|---|---|---|
| 3,728,948 A | 4/1973 | Fraser | |
| 3,953,106 A | 4/1976 | Furukawa | |
| 5,194,988 A | 3/1993 | Flother | |
| 5,341,246 A | 8/1994 | Oono | |
| 5,351,330 A | 9/1994 | Jongewaard | |
| 5,592,331 A | 1/1997 | Eastcott | |
| 5,626,411 A | 5/1997 | Takahashi et al. | |
| 5,689,378 A | 11/1997 | Takashima | |
| 6,295,754 B1 | 10/2001 | Otteman | |
| 6,318,912 B1 | 11/2001 | Shono | |
| 6,714,568 B2 | 3/2004 | Hunt | |
| 2003/0017081 A1 | 1/2003 | Trulson | |
| 2003/0107793 A1 | 6/2003 | Capps | |

| | | | |
|---|---|---|---|
| 2003/0147142 A1 | 8/2003 | Biswas | |
| 2004/0120036 A1 | 6/2004 | Wagner | |

(Continued)

FOREIGN PATENT DOCUMENTS

EP    0655638    5/1995

(Continued)

OTHER PUBLICATIONS

UK Examination Report dated Jan. 14, 2008, GB Appl. No. GB0614033.9.

*Primary Examiner*—Jordan M. Schwartz
*Assistant Examiner*—James C Jones
(74) *Attorney, Agent, or Firm*—Vierra Magen Marcus & DeNiro LLP

(57) ABSTRACT

A manipulator system 10 comprises a manipulator 14 which includes two pairs of adjustment screws 18a, 18b and 19a, 19b, which can be used to displace a lens group assembly 11 relative to the longitudinal axis of the manipulator when the lens group assembly 11 is inserted within the manipulator 14. The lens group assembly 11 comprises a holder 22 in the form of a hollow, cylindrical tube that has mounted in two lenses 12, 13. The holder 22 has a throughbore through which a laser beam may be passed in use. The manipulator system 10 can be used to adjust the tilt and displacement of the holder 22 (and hence of the pair of lenses 12, 13). Such adjustment will cause a laser beam passing through the manipulator system 10 and holder 22 to have, e.g., a particular pointing direction and shape when exiting the lens group assembly 11.

19 Claims, 4 Drawing Sheets

U.S. PATENT DOCUMENTS

2004/0252948 A1 * 12/2004 Alcock et al. .................. 385/73

FOREIGN PATENT DOCUMENTS

| | | |
|---|---|---|
| EP | 0853425 | 7/1998 |
| EP | 0881516 | 12/1998 |
| EP | 1081523 | 3/2001 |
| GB | 883977 | 12/1961 |
| GB | 1099026 | 1/1968 |
| GB | 2 325 058 | 11/1998 |
| GB | 2325058 | 11/1998 |
| GB | 2331593 | 5/1999 |
| GB | 2396222 | 6/2004 |
| WO | 03034141 | 4/2003 |
| WO | 03089971 | 10/2003 |

* cited by examiner

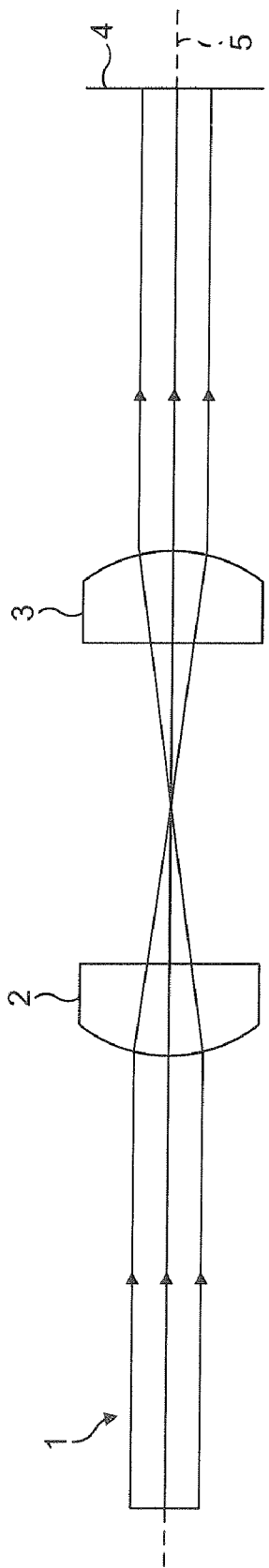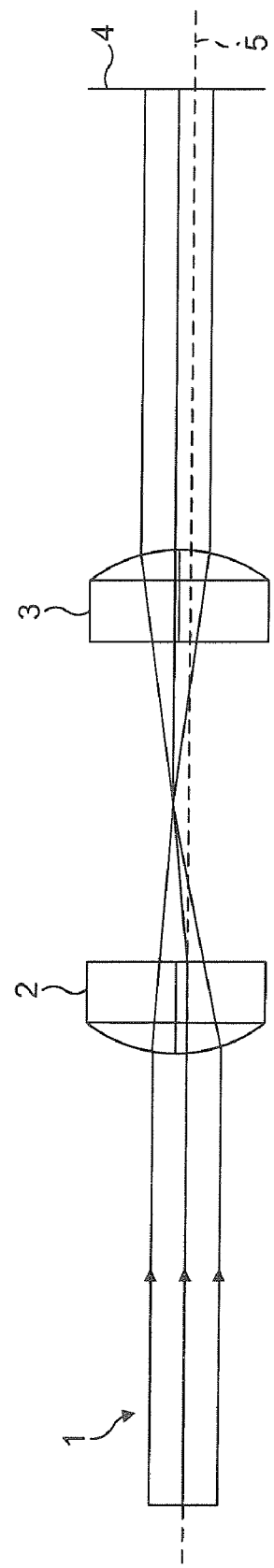

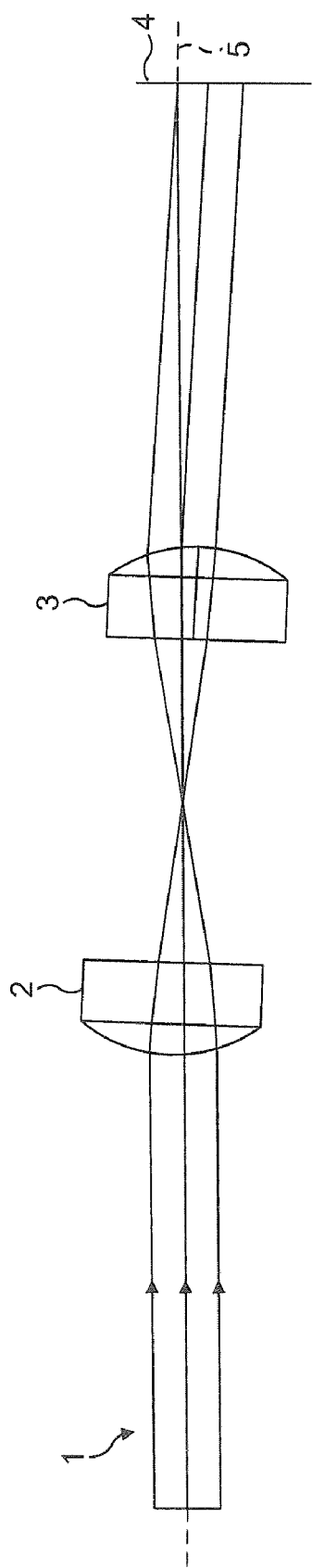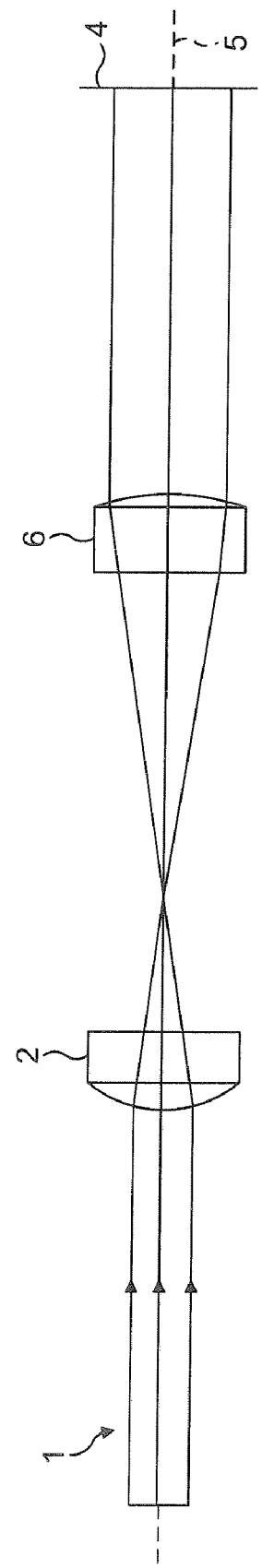

OPTICAL ASSEMBLY

CLAIM OF PRIORITY

This application claims the benefit of U.K. Patent Application No. 0514493.6 dated Jul. 14, 2005.

BACKGROUND

The present invention relates to an optical assembly, and in particular to an optical assembly for steering or directing electromagnetic radiation, such as a laser beam, towards a desired location.

In many optical applications, electromagnetic radiation, such as the beam from a laser source, needs to be directed towards a given target or targets. For example, in many systems a laser beam will need to be directed into an optical fibre for, e.g., delivery elsewhere.

The Applicants have already proposed, e.g., in their UK Patent numbers 2325058 and 2325057, devices and arrangements for coupling electromagnetic radiation, such as laser beams, into or between optical fibres. In these devices, the, e.g., laser source and optical fibre are arranged in close proximity to each other and may be adjusted relative to one another to provide an optimum coupling arrangement.

However, there are situations in which the electromagnetic radiation source, such as a laser, will need to be spaced from the target, such as an optical fibre, that it is to be directed at or into. For example, it may be desirable to include other optical components or elements, such as a modulator or beam combination optics, etc., between the, e.g., laser, source and the input to the, e.g., output optical fibre. In these arrangements it is usually still desirable to accurately align the, e.g., laser beam with the input face of the optical fibre, but this can be more difficult because the beam travels a greater distance in free space before it enters the fibre.

It is therefore known to use various techniques to try to align the electromagnetic radiation and, e.g., fibre. For example, the fibre's position can be adjusted in a similar manner to that described in the Applicants' earlier patents discussed above. Additionally or alternatively the radiation source, e.g., laser, could be mounted in such a way that the pointing direction of its output can be reliably and accurately adjusted. However, this can be difficult to achieve whilst still maintaining a sufficiently rigid mounting for stability purposes and also providing a suitable heat sink (thermal) path for heat dissipation.

It is also known to provide beam steering or tilting arrangements intermediate the source and target (e.g. optical fibre) to, e.g., allow some adjustment or steering of the, e.g. laser, beam towards the target. Such devices commonly comprise coupled mirror pairs whose mirrors can be tilted together or independently to move the position of the output beam. However, this requires additional optical components, with commensurate effects on the cost, size and complexity of the overall system.

In many optical systems the electromagnetic radiation, e.g. laser, beam may also need to be adjusted in size or shape to match it to a particular target, such as an input face of an optical fibre. This can be the case where, e.g., several lasers of different wavelengths are to be combined and input into a single fibre. In such a case, each laser beam may differ in size and/or shape, and it may therefore be desirable to condition the beams before they are input to the fibre to be similar (to look similar to the fibre) in size and shape (and, e.g., to optimise them in size and shape for the fibre). Such beam shaping can be done using a lens, but again this may add complexity and cost to the arrangement.

SUMMARY

The Applicants believe therefore that there remains scope for improvement in arrangements to, for example, steer and direct a laser beam at a desired target or targets.

According to a first aspect of the present invention, there is provided a method of directing a beam of electromagnetic radiation, comprising passing the beam through a group of lenses; and displacing the lenses laterally as a group, or tilting the lenses as a group relative to the radiation beam, thereby to redirect the beam as it exits the final lens of the group.

According to a second aspect of the present invention, there is provided an apparatus for directing a beam of electromagnetic radiation, comprising a group of lenses, one of the lenses being able to receive an input electromagnetic beam and another lens of the group being able to output the input beam; the lenses further being arranged such that they can be displaced laterally and/or tilted as a group relative to an input beam of electromagnetic radiation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1-4 illustrate the use of a pair of lenses to steer and shape a beam of radiation.

DETAILED DESCRIPTION

Figure 5:
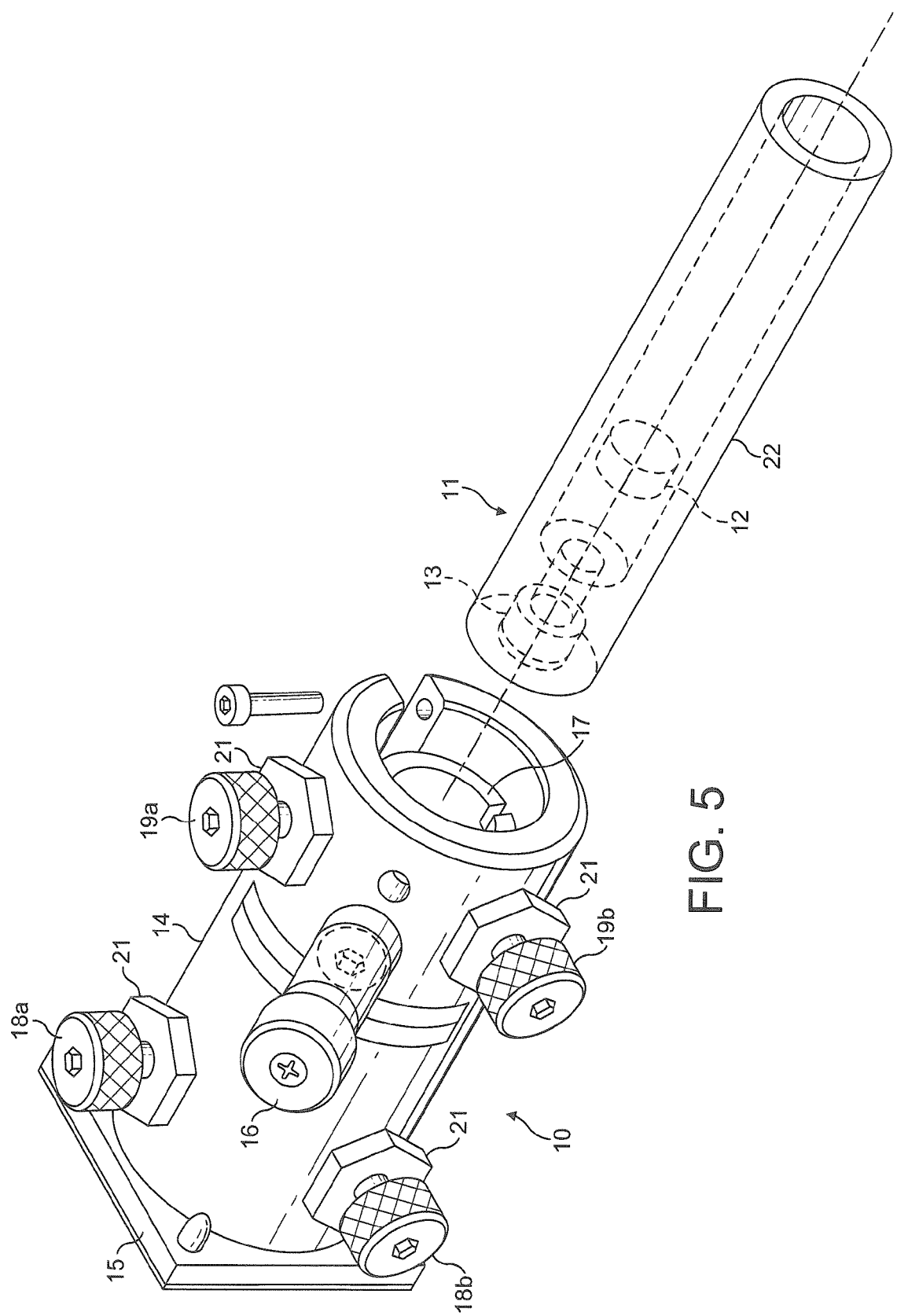
FIG. 5 shows an arrangement of a manipulator and a lens group arrangement.

According to a first aspect of the present invention, there is provided a method of directing a beam of electromagnetic radiation, comprising passing the beam through a group of lenses; and displacing the lenses laterally as a group, or tilting the lenses as a group relative to the radiation beam, thereby to redirect the beam as it exits the final lens of the group.

According to a second aspect of the present invention, there is provided an apparatus for directing a beam of electromagnetic radiation, comprising a group of lenses, one of the lenses being able to receive an input electromagnetic beam and another lens of the group being able to output the input beam; the lenses further being arranged such that they can be displaced laterally and/or tilted as a group relative to an input beam of electromagnetic radiation.

The Applicants have found that a group of lenses arranged such that a beam of electromagnetic radiation, such as laser beam, will pass through them in succession can be used to displace and move the path of the beam as between its pointing direction when it enters the first lens of the lens group and its pointing direction when it exits the last lens of the lens group. In other words a group of coupled lenses can be used to steer the beam in a desired direction, by moving the lenses in an appropriate manner. In particular, if the group of lenses are each moved laterally (in a direction perpendicular to the longitudinal axis of the lens group (the direction of the incoming beam)) by the same amount relative to an incoming beam, the beam will be translated laterally when it exits the lens arrangement. Equally, if the lens group is tilted with respect to the incoming beam, the beam will be tilted relative to its input direction when it exits the final lens, thereby effectively allowing the beam pointing direction to be tilted.

Furthermore, the lenses can also be used to and preferably are used to set the shape and size of the beam when it exits the final lens. For example, by selecting appropriate lenses and arranging them at an appropriate longitudinal spacing, a lens pair can be arranged to magnify or demagnify the exiting beam as compared to the input beam. Equally, changing the relative longitudinal spacing of the lenses can be used to provide a collimated, focussed or divergent output beam. Such "beam shaping" would allow, e.g., fine control of the beam shape, tuning of the beam, and the correction and reduction or removal of focussing errors.

Thus the present invention provides an optical arrangement that can be used both to point or steer a beam of electromagnetic radiation, and to shape or resize the beam. In other words, the optical arrangement of the present invention can be used to simultaneously shape and direct a beam of electromagnetic radiation in a controlled manner, whilst still using relatively few and simple optical components and arrangements.

The group of lenses should comprise at least two lenses. In a particularly preferred embodiment, there are two and only two lenses in the group of lenses (i.e. the lens arrangement) through which the beam passes (i.e. such that a pair of lenses is used), as this simplifies the arrangement. However, more than two lenses may be used if desired. In any event, the arrangement should be such that the group of lenses (e.g. lens pair) is movable (e.g. laterally displaceable and/or tiltable), as a group (e.g. pair).

The beam of radiation should pass through the lenses of the group (e.g. pair) of lenses in succession. The lenses of the group (e.g. pair) of lenses are preferably arranged to lie along a longitudinal axis such that the beam will pass through them in succession to facilitate this. The lenses preferably lie along and/or have a common, central longitudinal and/or optical axis, as this can make the arrangement more accurate and help with aligning the lenses if, for example, one of them needs to be replaced, or a new lens is to be added to the group of lenses. However, this is not essential and the lenses need not, e.g., be perfectly aligned, but could, e.g., simply be held in a generally aligned manner in some way. In a preferred embodiment, the lenses are mounted in a hollow tube or sleeve.

The lenses themselves can be any suitable lenses that will have a refractive or diffractive effect on the beam of electromagnetic radiation. In essence, the requirement is that the beam passes across a number (more than 3) of refracting or diffracting planes (i.e. interfaces at which it will be refracted or diffracted). This can be achieved by using two or more lenses, as discussed above.

Thus the lenses may be (and, indeed), preferably are), "conventional" lenses made of, e.g., glass or other transparent material and having at least one curved surface that the beam crosses (indeed, it is preferred for the lenses to each have at least one curved surface that the beam crosses). However, other forms of lenses, such as GRIN (graded refractive index) lenses, or Fresnel lenses, or other lensing optics, could also be used.

The lenses in the pair or group of lenses may be identical, or they may differ (for example in terms of their refractive index). This will depend, e.g., on whether unity magnification is required (in which case identical refractive index lenses may be desirable) or whether non unity magnification is required (in which case differing lenses may be preferable).

The group (e.g. pair) of lenses used in the present invention can be arranged and held in any appropriate manner. For example, they could be individually mounted to a stage that can then move them in unison.

However, in a particular preferred embodiment, the lenses in the group are mounted in a common holder that can then be manipulated to move the lenses. Most preferably the holder is in the form of a hollow body having a longitudinally extending throughbore that mounts the lenses and through which the radiation (e.g. laser) beam will pass in use. This holder is preferably in the form of unitary body, such as a sleeve or tube or cylinder. It may be of any cross section (as may the throughbore), but it is preferably cylindrical. The holder should be and is preferably rigid, such that it will not itself distort when moved to displace the group of lenses.

The holder preferably includes and contains only the lenses, although it may if desired include other optical components. For example, a short length of optical fibre may be included in the holder so as to provide a circular beam cross section, and/or quarter (or other) wave plates and/or a polarising element or elements could be included in the holder.

It is believed that such a holder and lens arrangement may be new and advantageous in its own right. Thus, according to a third aspect of the present invention, there is provided an optical assembly for steering a beam of electromagnetic radiation, comprising a hollow body having a throughbore through which a beam of electromagnetic radiation may be passed; and a group of lenses mounted in the throughbore through which a beam of electromagnetic radiation passing through the throughbore will pass.

According to a fourth aspect of the present invention, there is provided an optical assembly comprising a holder having a throughbore that mounts a group of lenses through which a beam of electromagnetic radiation may be passed.

These aspects and embodiments of the invention can, as will be appreciated by those skilled in the art, include any one or more or all of the optional features of the invention discussed and described herein. Thus, for example, the holder preferably mounts a pair (and preferably solely a pair) of lenses, and the holder is preferably a unitary, rigid, hollow body.

The lenses are preferably spaced apart from each other (e.g. in their holder), but this may not always be necessary and they could, if desired, also be joined together (as a unitary structure). In the latter case it is desirable (and may be necessary) for the lenses to have differing refractive indices, i.e. such that there is a refractive index change at the interface between two adjacent lenses, so as to achieve the beam steering effects of the present invention. The spacing between the lenses may be adjustable in use, but preferably the lenses are held at a fixed longitudinal spacing in use (e.g. in their holder).

In one preferred embodiment, the group of lenses is arranged such that the beam passes through the lenses without being magnified (or demagnified) in any way on its exit of the final lens. This could be achieved, e.g., by using two lenses having the same refractive index, and spacing them appropriately (e.g. at their focal lengths apart where the system receives a collimated input and is to provide a collimated output). Other arrangements to achieve "unity" magnification would, of course, be possible.

In another preferred embodiment the lenses are arranged to magnify (or demagnify) the beam. Again, this can be achieved by the use of appropriate lenses at an appropriate spacing.

In one preferred embodiment, the lenses are arranged so as to provide a collimated output beam. Again, this can be achieved by the use of appropriate lenses at an appropriate spacing.

In another preferred embodiment, the lenses are arranged to provide a convergent (focussed) or divergent output beam. Again, this can be achieved by the use of appropriate lenses at an appropriate spacing.

Thus, in a preferred embodiment, the lenses within the holder are arranged so as to magnify or demagnify the beam (a beam that is passed through them), and/or so as to provide a collimated, focussed and/or divergent output beam (so as to collimate, focus or diverge a beam that is passed through them).

Similarly, the method of the present invention preferably comprises arranging or adjusting the lenses (e.g. within the holder) so as to magnify or demagnify and/or collimate, diverge or focus the beam. Such adjustment could and preferably does comprise, e.g., adjusting the (relative) spacing of the lenses within the group, and/or changing or selecting the lenses to be used in the group. The group of lenses and, e.g., their holder, could be arranged such that such adjustments can be made in use (with the lenses then preferably being fixable and fixed in place after the adjustments have been made). It would also or instead be possible to initially construct the lens group assembly to provide a particular beam shaping, etc., function, and then fix the lenses permanently in place, such that further adjustments would then no longer be possible.

Where the lens group is arranged to provide some form of beam shaping, then that shaping could be symmetrical around the longitudinal axis of the beam, or an anamorphic beam shaping arrangement could be used, for example to provide different amounts of magnification in different radial directions of the cross section of the beam. Again this can be done using suitable lenses and arrangements of the lenses.

As discussed above, in use of the present invention, a beam of electromagnetic radiation, such as a laser beam, will be passed through the group (e.g. pair) of lenses, with the lenses then being movable so as to steer the beam in a desired direction upon its exit from the last lens of the group.

The arrangement is preferably such that the group of lenses can be laterally displaced as a group relative to the direction of travel of the input radiation beam, and/or tilted as a group relative to the direction of travel of the input radiation beam. Most preferably the group of lenses can be moved in both of these ways in use. Most preferably tilt and lateral displacement adjustments can be made independently of each other. Thus, for example, the group of lenses can preferably be displaced laterally as a group without any tilting of the group of lenses (i.e. such that once displaced laterally, the lens need not be and are not also tilted relative to their initial positions (and/or the radiation beam)).

Where the lenses are to be tilted relative to the radiation beam, then they may be tilted about any suitable pivot point. In one preferred arrangement they are pivoted about the first, input (upstream) lens of the lens group, but this is not essential and other arrangements could be used if desired.

These movements of the lenses can be achieved in any suitable manner, for example by mounting the lenses on a common stage, as discussed above.

However, in a particularly preferred embodiment, particularly where the lenses are mounted in a common holder, the lens arrangement (group) is displaced by using a manipulator device of the type already known for displacing optical fibres and optical fibre assemblies, and most preferably of the type described, e.g., in the Applicant's earlier UK Patent No. 2325058 and UK Patent Application Publication No. 2396222. In such arrangements, the holder mounting the group (e.g. pair) of lenses could be inserted in the manipulator in the same manner as the optical fibre assembly, and then its position relative to an input radiation beam (e.g. from a laser to which the manipulator is mounted) adjusted accordingly so as to steer and/or shape the exiting radiation beam.

Thus, in a particularly preferred embodiment, the beam steering apparatus and system of the present invention preferably includes both a lens group assembly as discussed above (e.g. a group (e.g. pair) of lenses mounted, e.g., in a common holder), and a manipulator that can receive the lens group assembly and be used to displace the lens group assembly in use.

Thus, according to a fifth aspect of the present invention, there is provided an apparatus for directing a beam of electromagnetic radiation, comprising: a lens group assembly comprising a group of lenses, one of the lenses being able to receive an input electromagnetic beam and another lens of the group being able to output the input beam; and a manipulator means having a body having a throughbore adapted to receive the lens group assembly in use, the manipulator means further including one or more adjustment means which are adjustable by a user to move the lens group assembly when it is inserted in the manipulator means throughbore.

This aspect and embodiments of the invention can include any one or more or all of the preferred and optional features of the present invention discussed herein. Thus, for example, the lens group assembly preferably comprises an elongate holder having a throughbore and a pair of lenses mounted in its throughbore.

In a particularly preferred arrangement of these embodiments and aspects of the invention, the manipulator can adjust the lateral position of the lens group assembly within the manipulator body throughbore. Preferably the lens group assembly can be moved in a direction perpendicular to the longitudinal axis of the throughbore, and/or the tilt of the longitudinal axis of the lens group assembly relative to the longitudinal axis of the manipulator's throughbore can be adjusted.

To facilitate this the manipulator preferably includes one or more adjustors or adjustment means that are adjustable by a user to move an inserted lens group assembly relative to the manipulator in a direction perpendicular to the longitudinal axis of the manipulator body throughbore. The adjustment means are preferably arranged such that they can be used to adjust the tilt of the longitudinal axis of the lens group assembly relative to the longitudinal axis of the manipulator body's throughbore, and/or are arranged such that they can be used to laterally displace the lens group assembly (as a whole) relative to the longitudinal axis of the manipulator body's throughbore.

The adjustment means can be any suitable such means, such as screws which can be arranged to penetrate the manipulator means wall into the throughbore, as in the prior art connectors described above, or other devices which would allow manipulation of an inserted lens group assembly, such as piezo electric devices.

The number and exact arrangement of the adjustment means will depend upon the parameters desired to be adjustable. Preferably at least two adjustment means are provided. This makes tilt adjustment easier. The adjustment means could, for example, be arranged as in the prior art connectors discussed above. For example, at least a pair of substantially mutually orthogonal and/or a pair of longitudinally spaced, adjustment means could be provided.

The adjustment means preferably engage any surface that they act on at discrete points, rather than over extended portions of their surfaces. This helps the accuracy of the adjustment and engagement. The adjustment means can have, for example, spherical contact surfaces.

The adjustment means could act directly on an inserted lens group assembly. However, in a particularly preferred embodiment, the manipulator further includes a separate carrier means that receives the lens group assembly and upon which the adjustment means act. This separate carrier means preferably has a body having a throughbore adapted to receive the lens group assembly in use, and can be inserted into the manipulator's throughbore such that the adjustment means are then engageable against the outer surface of the carrier means so as to move the carrier means (and hence a lens group assembly inserted in the carrier means) relative to the manipulator body in a direction perpendicular to the longitudinal axis of the manipulator body throughbore.

In a particularly preferred embodiment, the carrier means is a hollow tube or sleeve, and can float within the manipulator body throughbore and receive, preferably removably, a lens group assembly in use.

In a particularly preferred embodiment, the manipulator system is arranged such that one or more discrete rotational orientations of a lens group assembly within the manipulator's throughbore can be identified and arranged. Preferably the arrangement is such that only a single rotational orientation can be so identified and arranged.

An ability to reliably fix the rotational orientation of the lens group assembly may be desirable, e.g., where a particular polarisation alignment is desired, or if non rotationally symmetric components or elements are being used. An ability to fix the rotational alignment may also help with regard to maintaining any previously established adjustments, such as trimming corrections that have been made, when the lens group assembly is removed and reinserted in the manipulator system. It could also be useful where the lens group provides anamorphic beam shaping, i.e., shapes the beam differently in different directions relative to its longitudinal axis.

The indication and fixing of such discrete rotational orientations can be achieved as desired. Preferably, the manipulator system is provided with, for example, keying means such as surfaces or lands that mean that one or more (and preferably only one) discrete orientations with respect to rotation about the manipulator system's throughbore's longitudinal axis can be readily identified and the lens group assembly accordingly placed in those orientations or that orientation.

Thus, for example, such rotational alignment could be provided by including one or more lands on the outer surface of the lens group assembly (where the adjustment means engage the lens group assembly), or on the outer surface of the carrier means (where the adjustment means engage the carrier means), arranged such that the lens group assembly or carrier means, respectively, can be inserted into the manipulator means in such a way that the adjustment means will in use engage only the lands, and can only be so inserted into the manipulator means in one or more (and preferably only one) discrete orientations with respect to rotation about the longitudinal axis of the manipulator means throughbore.

In a particularly preferred such embodiment, the lands that the adjustment means engage are planar. Using planar, flat surfaces for the lands helps to avoid crosstalk between the different adjustment means (which could occur, e.g., if the adjustment means act on a curved surface).

In these arrangements, the lands can also be arranged to fix the point about which the lens group assembly or carrier means pivots when its tilt relative to the manipulator is adjusted, and/or to fix the position of the lens group assembly or carrier means, respectively, along the longitudinal axis of the manipulator means throughbore.

In a particularly preferred embodiment, the arrangement is such that the rotational orientation of an inserted lens group assembly can be adjusted, but then the relative rotational position of the lens group assembly about the longitudinal axis of the manipulator throughbore can be fixed (for future insertions of the lens group assembly).

Thus, preferably, the manipulator system comprises a separable keying means which mates with the manipulator body in a fixed orientation with respect to rotation about the longitudinal axis of the manipulator body throughbore, which keying means is securable to a lens group assembly.

The separable keying means can be secured to the lens group assembly by any suitable means, such as grub screws. It can be arranged to mate with the manipulator body in a predetermined rotational alignment by any suitable means, such as the manipulator body or keying means including a pin which engages a slot or hole in the keying means or manipulator body, respectively.

The keying means can also preferably be used to fix the position of the lens group assembly along the longitudinal axis of the manipulator body, for example by securing it to the lens group assembly at an appropriate point along the length thereof.

In a particularly preferred embodiment, the separable keying means is in the form of a separable collar, most preferably in the form of a "p" ring, that can be secured to a lens group assembly.

Where a separate carrier means that receives the lens group assembly is provided, rotational alignment and fixing is preferably achieved by allowing the rotational orientation of the carrier means in the manipulator body to be fixed, preferably by having, as discussed above, preferably planar, lands with which the adjustment means of the manipulator engage appropriately located and orientated on the carrier means such that the lands will only align properly with the adjustment means of the manipulator in one particular orientation with respect to the rotation about the longitudinal axis of the throughbore of the carrier means, and then locating the lens group assembly in the carrier means such that it is fixed against rotation about its longitudinal axis in the carrier means.

The latter arrangement is preferably achieved, as discussed above in relation to rotation within the manipulator body in general, by providing an appropriate keying arrangement on the carrier means and lens group assembly. Thus most preferably, the carrier means further comprises a separable keying means, preferably in the form of a collar, which mates in a fixed orientation with respect to rotation about the longitudinal axis of the carrier means throughbore with the carrier means body, which keying means is securable to the lens group assembly.

This arrangement will allow, e.g., the lens group assembly to be removed from the carrier means and the manipulator means and reinserted therein without the loss of rotational realignment.

In a preferred embodiment, the lens group assembly is removably retained in the manipulator body (and carrier means, where provided), such that it can be repeatedly removed therefrom and reinserted therein.

In a particularly preferred such arrangement where a carrier means is provided, the lens group assembly is releasably retained in the carrier means when it is inserted therein, such that it can be repeatedly removed from and reinserted in the carrier means, but without the need to remove the carrier means from the manipulator. The carrier means could, for example, include means such a spring, for releasably resiliently retaining the lens group assembly when it is inserted therein.

Where the lens group assembly is removable from the carrier means without the need to remove the carrier means as well from the manipulator body, then the carrier means is preferably retained in its position in the manipulator body once the lens group assembly has been removed. This could be achieved by, for example, suitable springs or magnets being located on the carrier means and/or manipulator body.

In a particularly preferred embodiment, the manipulator system further includes means for resiliently biasing the lens group assembly against the manipulator system body. Where adjustment means are provided, the lens group assembly is preferably resiliently biased against the adjustment means.

Where the manipulator system also includes a carrier means that receives the lens group assembly, then the carrier means is also according preferably resiliently biased against the manipulator system body and/or adjustment means. In this case, the biasing means could act on the carrier means directly, or it could do so indirectly, for example, by acting on the lens group assembly and thereby on the carrier means.

In a preferred such arrangement, there are separate resilient biasing means for biasing the lens group assembly against the manipulator body and for biassing the carrier means against the manipulator body. This arrangement would allow, for example, a different biassing force to be applied to the lens group assembly and the carrier means.

The resilient biasing means can also be used to fix the position of the carrier means (or lens group assembly) along the longitudinal axis of the manipulator body throughbore, if desired. For example, the biassing means could engage a slot or groove provided in the outer surface of the carrier means (or lens group assembly) at a given longitudinal position along the carrier means (or lens group assembly).

The resilient bias can be provided by, for example, a spring or springs, or by suitably arranged magnets. In a particularly preferred embodiment, the resilient biassing means is in the form of one or more leaf springs that extend along the longitudinal axis of the manipulator body throughbore.

The means for providing the biassing force is preferably arranged such that the biassing force can be selectively removed and reapplied when desired. This can allow, e.g., the carrier means and/or lens group assembly to be removed from the body without any need to move the positions of the adjustment means.

Such selective application of the biassing force could be provided, e.g., by a user operable screw or screws that can act to increase and decrease the force applied by a spring to the carrier means and/or lens group assembly. A ratchet type arrangement could be provided to facilitate more precise control of the biassing force, and/or to limit the biassing force that can be applied, if desired.

In a particularly preferred embodiment, only the resilient biassing force on the lens group assembly can be selectively removed and reapplied.

Where the biassing action is selectively removable by a user, then most preferably the means for removing and applying the biassing action can be accessed by a user from the same side of the manipulator body (i.e. around the manipulator's outer circumferential surface) as the adjustment means.

In a particularly preferred embodiment, where the resilient biassing force can be selectively applied by a user, the arrangement is such that the means for applying the resilient biassing force is biased to apply that force automatically (if a lens group assembly is inserted in the manipulator body), but is operable by a user to release the force being applied. Thus the means for selectively applying the resilient biassing to an inserted optical fibre assembly preferably has two states: a first, default state in which it biassed to a position where it would apply a biassing force to an inserted lens group assembly, and a released state into which it can be forced by a user. These arrangements are preferably further arranged such that a user is unable to adjust the amount of force applied to an inserted lens group assembly when the biassing means is set in its "biassing" position (i.e. when it applies the biassing force) (i.e. such that a user can effectively only operate the biassing means to release the force being applied).

These arrangements are advantageous as they mean that a user simply has to release the force to insert and remove a lens group assembly, but does not need then to otherwise adjust the system to apply the resilient biassing force when the lens group assembly is inserted. They therefore provide a "quick release" type operation.

The manipulator could also, if desired, mount other optical elements, such as a polarising element, in its throughbore in use.

In use, a manipulator and lens group assembly of the type discussed above could, e.g., be mounted to an electromagnetic radiation source, such as a laser, and then used to, e.g., direct, steer or shape the beam of electromagnetic radiation, e.g., laser beam, provided by the source, for example at a particular target, particularly where, e.g., there is a distance of, e.g., free space, to cross before the beam reaches its target. In these arrangements, the manipulator and lens assembly could be, e.g., mounted externally of the source, or, e.g., be internal, but accessible for adjustment purposes in use.

Providing a manipulator and lens group assembly mounted on or in a radiation source, such as a laser, in this manner is advantageous, because it, for example, allows the lens group assembly to be used to trim out any residual beam pointing, focussing, beam shape etc., tendencies or errors of the source. This would facilitate, for example, more straightforward replacement of an electromagnetic radiation source, such as a laser, in use (e.g. in the field), since, for example, any different beam pointing tendencies in the replacement source could be compensated for simply by adjusting the lens group assembly to trim them out.

Such arrangements could also be used, for example, to trim out any initial alignment errors to the target in use, rather than, e.g., having to adjust the positions of the source and/or target themselves. Indeed, an important advantage of the present invention is that it manipulates the radiation beam and thereby removes the need to, e.g., manipulate or adjust the position of the target (e.g. optical fibre). These arrangements would also allow, e.g., the source beam to be shaped as desired to match the target (e.g. optical fibre) in use (e.g. by changing or adjusting the lens group assembly that is being used).

Arrangements such as these may in particular be useful, e.g., where plural radiation sources, such as laser beams (e.g. of differing wavelengths), are to be coupled (and combined) into a single target, such as an optical fibre (as would, e.g., be the case for a laser "engine", i.e. where plural lasers of differing wavelengths are combined into a single common beam). In this case, a lens group arrangement of the present invention could be used with each source (e.g. laser) to "tune", i.e. shape and direct, the source beam to the target (e.g. optical fibre), so that the plural sources can be combined appropriately at or in the target.

Thus, according to a sixth aspect of the present invention, there is provided an apparatus for delivering a beam of electromagnetic radiation, comprising: a radiation source that outputs a beam of electromagnetic radiation and having a housing; a lens group assembly comprising a group of lenses; and a manipulator means having a body having a throughbore adapted to receive the lens group assembly in use, the manipulator means further including one or more adjustment means which are adjustable by a user to move the lens group assembly when it is inserted in the manipulator means throughbore; the manipulator means being mounted on or in the housing of the radiation source such that the output beam of radiation from the radiation will, in use, pass through the manipulator means throughbore and thereby through the lenses of the lens group assembly when the lens group assembly is inserted in the throughbore.

This aspect and embodiments of the invention can, as will be appreciated by those skilled in the art, include any one or more or all of the preferred and optional features of the invention described herein, as appropriate. Thus, for example, the lens group assembly preferably mounts a pair of lenses, and the radiation source is preferably a laser.

In the above arrangements, the lens group arrangement or assembly of the present invention will be used by a user in use to manipulate and steer the beam provided by the source. The adjustment arrangement, e.g., manipulator, provided for adjusting the lens group assembly should therefore be accessible to the user, and is therefore preferably mounted externally on or to the housing of the radiation source.

In another preferred embodiment, the lens group arrangement of the present invention is used to adjust and align the beam from a radiation source, such as a laser, to a reference point or another component such as a connector for an optical component such as an optical fibre or optical fibre assembly, on or mounted on or in the source or its housing.

For example, the lens group arrangement could be used (and, indeed, in a preferred embodiment is used) to accurately align the beam from, e.g., a laser with a connector for receiving an optical fibre or optical fibre assembly mounted to the laser. Such an arrangement may mean then that an optical fibre or optical fibre assembly inserted in the connector may need less or even no subsequent adjustment relative to the laser source before it can be used. This could then allow, e.g., the laser, lens group arrangement and optical fibre connector to be accurately pre aligned on manufacture or supply, such that a user may then simply be able to "plug and play" their optical fibres or optical fibre assemblies, without the need for further adjustment in use or in the field. This would provide a significantly more straightforward system for end users to use.

In these cases, the lens group assembly may not need to be (and indeed preferably is not) end-user adjustable, and thus can be and preferably is mounted internally of the housing of the radiation source (e.g. laser).

Thus, according to a seventh aspect of the present invention, there is provided an apparatus for delivering a beam of electromagnetic radiation, comprising a radiation source that outputs a beam of electromagnetic radiation and having a housing; a lens group assembly comprising a group of lenses; and a connector mounted on or in the housing of the radiation source and having a throughbore for receiving an optical component; the radiation source, lens group assembly and connector being arranged such that in use the radiation beam from the radiation source will pass through the lens group assembly and then through the connector throughbore.

Again, as will be appreciated by those skilled in the art, this aspect and embodiments of the invention can include any one or more or all of the preferred and optional features of the invention described herein. Thus, for example, the radiation source is preferably a laser, and the lens group assembly preferably comprises a pair of lenses.

As discussed above, in these aspects and embodiments of the invention, the lens group assembly is preferably used to prealign the radiation beam to the connector for receiving the optical component, such that the optical component can then be inserted in that connector without the need for any further adjustment.

This prealignment can be achieved as desired, for example by adjusting the lens group assembly within the radiation source and then fixing it in place. However, in a particularly preferred embodiment, the arrangement further comprises a manipulator of the type discussed above, or described in the Applicant's UK Patent No. 2325058 and UK Patent Application Publication No. 2396222, in which the lens group assembly is mounted and which can thereby be used to adjust the position of the lens group assembly to align the radiation beam to the connector.

Thus, according to a eighth aspect of the present invention, there is provided an apparatus for delivering a beam of electromagnetic radiation, comprising: a radiation source that outputs a beam of electromagnetic radiation and having a housing; a manipulator means mounted on or in the housing of the radiation source and having a body having a throughbore and arranged such that the beam of radiation from the radiation source will pass through the throughbore in use; a lens group assembly comprising a group of lenses arranged in the throughbore of the manipulator means; the manipulator means further including one or more adjustment means which are adjustable to move the lens group assembly when it is inserted in the manipulator means throughbore; and a connector having a throughbore for receiving an optical component and mounted on or in the housing of the radiation source and arranged so as to receive in use the radiation beam from the radiation source once it has passed through the manipulator means throughbore.

Again, as will be appreciated by those skilled in the art, this aspect and embodiments of the invention can include any one or more or all of the preferred and optional features of the invention described herein. Thus, for example, the radiation source is preferably a laser, and the lens group assembly preferably comprises a pair of lenses.

In these aspects and embodiments of the invention, the optical component can comprise any suitable such component, such as a lens or filter or other optical device. In a preferred embodiment it comprises or includes an optical fibre, and most preferably comprises an optical fibre assembly, such as a tube or barrel mounting an optical fibre alone, or a tube or barrel mounting an optical fibre and another optical component or element (such as a lens) (preferably in a fixed relationship), or even an optical fibre on its own.

Indeed, these arrangements of the present invention are particularly useful for coupling an, e.g., laser beam into an optical fibre, since they can remove the need to manipulate the fibre to ensure good coupling alignment.

The connector mounted to the, e.g., laser, for receiving the optical component, e.g., optical fibre, can take any desired and suitable form. Thus it could, for example, be in the form of a manipulator, such as that discussed above and those described in the Applicant's earlier UK Patent No. 2325058 and UK Patent Application Publication No. 2396222, i.e. that would still allow adjustment of the optical component (e.g. optical fibre or optical fibre assembly) in use.

However, in a particularly preferred embodiment, the connector for receiving the optical component (e.g. optical fibre or optical fibre assembly) is of the form described in the Applicant's earlier UK Patent No. 2325057, as such a device then removes the need (and possibility) of any user adjustment in the field. This is possible because the lens group arrangement of the present invention can be used to pre align the laser, etc., beam with the connector sufficiently accurately that any further adjustment of the laser, etc., relative to an inserted optical fibre, etc. (in the connector) (or vice versa) should not be necessary. This then provides a device that can accurately couple an, e.g. laser, beam into an optical fibre, without the need for any end user adjustment.

The connector for receiving the optical component therefore preferably has a throughbore having discrete engagement means against which an inserted optical component can be biassed in such a manner that the optical component only engages the body of the connector via the engagement means (and the biassing means).

Thus, in a particularly preferred embodiment, the connector for receiving the optical component (e.g. optical fibre assembly) comprises a hollow body having a throughbore adapted to receive loosely the optical component in use, at least two discrete engagement means located at circumferentially spaced apart positions within the hollow body throughbore, and biassing means engageable against an inserted optical component in use to bias the component against the engagement means and thereby against the hollow body, wherein the biassing means and engagement means are arranged such that the biassing means can be engaged against an inserted optical component in use in such a manner that the optical component engages only the biassing means and the engagement means and in such an arrangement is spaced apart from the inner surface of the hollow body throughbore.

In these arrangements, the engagement means of the connector can be any suitable means that can provide discrete engagement surfaces for an optical component with the connector throughbore and space the component from the throughbore inner surface. For example, they could comprise ridges or discrete studs extending radially from the throughbore inner surface towards the longitudinal axis of the throughbore. They preferably substantially do not deform when an optical component is biassed against them.

The engagement means are preferably adapted and arranged such that they engage an inserted optical component and/or the throughbore of the connector (if appropriate) at discrete points, rather than over an extended region, and/or are preferably arranged such that they will in use space an inserted optical component substantially uniformly from the throughbore inner surface along the entire length of the assembly.

In these arrangements, engagement means are preferably located at spaced intervals along the length of the throughbore of the connector as well as at spaced intervals around the circumference of the throughbore, such that a properly inserted optical component engages in use longitudinally and circumferentially spaced engagement means. In a preferred embodiment, there are four engagement means arranged in two pairs spaced along the longitudinal axis of the connector's throughbore, with the individual engagement means of each pair being located at the same longitudinal position in the throughbore but spaced from each other around the bore's circumference.

The engagement means should be resistant to and preferably secured against longitudinal movement as an optical component is inserted or removed. However, they are preferably free to rotate as an optical component is moved past them. Such rotation can make it easier to insert or remove an assembly. Furthermore, it allows different parts of the engagement means surface to engage an optical fibre assembly for any given insertion.

The engagement means thus preferably comprise rotatable members, such as suitably mounted balls or rotatable rollers or cylinders.

In these arrangements, the engagement means could be rotatably mounted or carried by the connector hollow body directly. However, in a particularly preferred embodiment the connector includes a hollow sleeve mounted coaxially within the connector body throughbore and adapted to receive the optical component, which carries the engagement means in such a manner that they are free to rotate. The sleeve could, for example, include a plurality of holes located appropriately in it longitudinal surface, with an engagement means being located in each hole in such a manner that it is free to rotate.

In such an arrangement, the engagement means are preferably sized and arranged such that they can protrude beyond each longitudinal surface of the sleeve simultaneously, as this enables them to engage the throughbore inner surface and the optical fibre assembly simultaneously, such that the assembly does not have to engage the connector body via contact with the sleeve. They are preferably free to float radially of the sleeve, at least a small distance.

The engagement means are preferably arranged such that they are retained in the throughbore even when an optical component is not inserted. This prevents the engagement means falling out of the connector when a component is not inserted.

The biassing means of the connector for receiving the optical component in these arrangements and embodiments of the invention can be any suitable means which can bias an inserted optical component against the engagement means and thereby against the inner surface of the connector body throughbore. It could for example comprise a screw mounted in the hollow body which can be screwed into the throughbore to engage the optical fibre assembly. However, in a particularly preferred embodiment, the biassing means are resilient biassing means that can resiliently bias an optical component against the engagement means in use. The resilient biassing means could, for example, comprise a spring or springs or magnets arranged to act appropriately on an inserted optical component.

The biassing means could be arranged to apply its biassing force automatically whenever an optical fibre assembly is inserted, or such that the biassing force is selectively applicable by a user.

Most preferably the biassing means is arranged such that the biassing force is not applied until the optical component, e.g. optical fibre assembly, is substantially fully inserted in the connector, or is inserted in the connector a predetermined distance, or such that the biassing force can be selectively applied by a user. With a resilient biassing means this latter arrangement could be achieved by, for example, providing actuating means which in its actuated state causes the resilient biassing means to engage an inserted optical fibre assembly, but which can be returned in an unactuated state to remove or not apply the resilient biassing force.

The biassing means of the connector preferably engage an inserted optical component at discrete points, rather than over an extended region. Thus it or they preferably include contact means adapted so as to engage an optical component in point contact in use.

In these arrangements and embodiments of the invention, the connector for receiving the optical component is preferably arranged or arrangeable such that an optical component can only be inserted in the connector in a particular orientation with respect to rotation about the longitudinal axis of the connector body throughbore. This can be achieved as desired. For example, a separable collar (for example in the form of a "p" ring), for example as discussed above in relation to fixing, e.g., the rotational alignment of the lens group assembly within a manipulator, which mates in a fixed orientation with respect to rotation about the longitudinal axis of the connector throughbore with the connector body, and that is securable to an optical component in use, could be used for this purpose.

The present invention is applicable to and can be used with and for any suitable form of electromagnetic radiation beam. It is particularly intended for use with coherent, and preferably also monochromatic, electromagnetic radiation beams and sources. Thus, in a particularly preferred embodiment, the electromagnetic radiation beam is a coherent, and preferably monochromatic, beam, and the radiation source, where provided, is preferably a source of coherent, and preferably monochromatic, radiation. Thus, in a particularly preferred embodiment, as discussed above, the radiation beam is a laser beam (and the radiation source, where provided, is a laser).

As will be appreciated by those skilled in the art, all of the above aspects and embodiments of the invention can include any one or more or all of the preferred and optional features of the invention described herein, as appropriate.

FIGS. 1 to 4 show the effect of the movement of a pair of lenses on the direction and shape of a beam of radiation.

FIG. 1 shows an arrangement in which a laser beam is passed through a pair of lenses 2, 3 to a target 4. In this arrangement, the lenses 2 and 3 are identical, have identical refractive indices, and are spaced their focal distance apart. This means that there is no magnification (i.e. unity magnification) of the laser beam 1 when it exits the second lens 3. In FIG. 1, laser beam 1 is also arranged to travel parallel to the central longitudinal axis 5 of the lens arrangement. This means that the beam's pointing direction remains along and parallel to that axis when the beam exits the second lens 3.

FIG. 2 shows the effect of translating the pair of lenses 2, 3 laterally (i.e. in a radial or perpendicular direction) relative to the initial longitudinal axis 5 of the arrangement (i.e. the initial direction of travel of the laser beam 1). It should be noted here that the lenses 2, 3 are displaced laterally by identical amounts, i.e. they are translated laterally as a pair. It can be seen that the effect of this is that the output laser beam has been displaced laterally relative to the longitudinal axis 5, but still travels parallel to that axis.

FIG. 3 shows the effect when the lenses 2, 3 are tilted as a pair relative to the longitudinal axis 5 (i.e. the input direction of travel of the laser beam 1). As can be seen, in this arrangement, the output laser beam exiting the second lens 3 has been tilted.

It should be noted with regard to FIGS. 2 and 3, that since the lenses 2 and 3 remain identical and are set at their focal distance apart, there is no magnification of the laser beam, rather it remains the same size and collimated.

It can be seen from the above that by appropriate translation and/or tilting of the lens pair, the position and pointing direction of the laser beam 1 can be manipulated and adjusted. In particular, moving the pair of lenses laterally (i.e. perpendicular to the direction of travel of the laser beam) moves the beam laterally and so can be used to translate the beam laterally to its initial direction of travel, and tilting the pair of lenses relative to the direction of travel of the laser beam tilts the laser beam. In this way, the beam pointing direction can readily be adjusted.

As discussed above, the lens arrangement of the present invention can also be used to change the shape (i.e. magnify or demagnify) the laser beam. FIG. 4 illustrates this.

In the arrangement shown in FIG. 4, the second lens 3 has been replaced with a different lens 6 having a different optical power. The lenses are still spaced their focal distances apart, but as can be seen from FIG. 4, the arrangement now is such that the beam 1 has been magnified when it exits the second lens 6. (It would, of course, also be possible to select the second lens appropriately so as to demagnify the beam, if desired.)

It can be seen therefore that by changing the focal lengths of the lenses used, appropriate magnification of the laser beam can be achieved.

It would also be possible to use the lens arrangements to focus and/or collimate the laser beam, for example to provide convergent, divergent or a parallel output, as desired. This can be achieved simply by adjusting the longitudinal spacing between the lenses in an appropriate manner.

The arrangements shown in FIGS. 1 to 4 use "conventional" transparent lenses having curved surfaces. However, other lens arrangements that have a refractive or diffractive effect on the laser beam would be possible. For example, GRIN lenses or Fresnel lenses could be used.

FIG. 5 shows an arrangement of a manipulator system 10 that can receive in use a lens group assembly 11 comprising a holder 22 containing a pair of lenses 12, 13, and that can be used to adjust the tilt and displacement of the holder 22 (and hence of the pair of lenses 12, 13), thereby to steer and shape a laser beam passing through the manipulator system 10 and holder 22, in the manner described above.

In this arrangement, the lens group assembly holder 22 comprises a hollow, cylindrical tube that has mounted in it the two lenses 12, 13. The holder 22 has a throughbore through which a laser beam may be passed in use.

The manipulator system 10 is a manipulator as described in the Applicant's UK Patent Application Publication No. 2396222.

Thus, the manipulator system 10 shown in FIG. 5 comprises a main body in the form of a manipulator 14 in the form a cylindrical tube having a throughbore which removably receives a sleeve-like carrier 17 again in the form a cylindrical tube having a throughbore. The carrier 17 receives removably the lens group assembly 11 which is to be adjusted by means of the manipulator system 10.

While the manipulator, carrier and lens group assembly holder are shown as being in the form of cylindrical tubes, it will be appreciated that they can have other geometries, if desired.

The manipulator 14 includes a flange 15 by which it can be attached to an optical component such as a laser source. The flange can alternatively be used to attach the manipulator to an optical bench.

The manipulator 14 also includes two pairs of adjustment screws 18a, 18b and 19a, 19b, with the screws of each pair being arranged at the same position along the longitudinal axis of the manipulator body, but acting in orthogonal directions towards and away from the longitudinal axis of the manipulator. In this way, appropriate rotation of the screws can be used to displace the carrier 17 and lens group assembly 11 when inserted within the manipulator 14 relative to the longitudinal axis of the manipulator.

The contact tips of the adjustment screws allow the contact point with the carrier to be well defined and the carrier 17 to pivot about it. The screws therefore preferably have spherical ends. The screw tips should also ideally be sufficiently hard such that deformation of them in use is reduced or eliminated. They could, for example, comprise hardened steel or ceramic balls.

The adjustment screws 18, 19 could, for example, comprise fine pitch screws which operate radially, or differential threaded screws, or tapered pins. Locking rings 21 can also be provided to prevent accidental movement of the adjustment screws in use.

The sensitivity of the lateral adjustment can be altered by varying the screw pitch, and the tilt sensitivity can be varied by changing the lateral sensitivity or separation of the adjustment points, or a combination of the two.

Other forms of adjustment means such as, for example, piezo devices are, of course, possible.

In this arrangement, the adjustment means (adjustment screws 18, 19) provide the possibility of lateral adjustment of the lens group assembly 11 relative to the longitudinal axis of the manipulator 14, and adjustment of the tilt of the longitudinal axis of the lens group assembly 11 relative to the longitudinal axis of the manipulator 14, when the lens group assembly 11 is inserted in the manipulator body 14.

The carrier 17 of the manipulator system 10 is in the form of a hollow sleeve which has planar lands on its outer surface which are arranged to be engaged by the adjustment screws 18, 19 in use.

In this embodiment, the planar lands of the carrier 17 engaged by the adjustment screws are in the form of plural pads which have flat, planar surfaces 25 arranged in holes 27 in the carrier body such that their flat surfaces effectively form part of the outer surface of the carrier.

The pads are arranged in the carrier such that carrier 17 and manipulator 14 can be arranged such that the adjustment means 18, 19 of the manipulator engage only the flat planar surfaces (i.e. lands) when the carrier is inserted in the manipulator.

The carrier 17 also includes a separable collar (not shown) which mates with the main body of the carrier in a single orientation with respect to rotation about the longitudinal axis of the carrier. To achieve this, the collar has a pin which engages in a corresponding slot on the carrier body. The collar further includes a number of grub screws to enable it to be secured to the lens group assembly 11 in use. The collar allows the rotational orientation of the lens group assembly with respect to the carrier and thereby the manipulator to be fixed.

The securement position of the collar on the lens group assembly 11 can also be chosen to be at an appropriate point along the length thereof to ensure that the flat lands on the carrier lie about the point at which it is desired to pivot the lens group assembly, such as about one of the lenses of the lens group assembly.

The collar also includes a pin which can engage a slot on the manipulator 14 and be secured therein by a further pin to constrain the carrier within the manipulator.

The manipulator and carrier may also include magnets (not shown) which can retain the carrier 17 within the manipulator 14 even when the lens group assembly has been removed therefrom. The magnets are appropriately arranged such that they retain the carrier in a position where the flat lands on its outer surface are aligned with the contact tips of the adjustment screws 18, 19.

The manipulator system 10 also includes a user operable resilient biassing arrangement which can be used to selectively apply a resilient biassing force to an inserted lens group holder 11. This arrangement comprises an adjustment screw 16 that acts on a collar (not shown) which surrounds the carrier 17 (and hence an inserted lens group holder 11) within the manipulator 14 throughbore. Screwing the adjustment screw 16 towards and away from the central longitudinal axis of the manipulator system 10 moves the collar away from and towards, respectively, the adjustment means 18, 19 (and the adjusting screw 16). This causes the collar to act on a leaf spring which extends longitudinally within the throughbore and can penetrate through the carrier means 17 and engage an inserted lens group holder 11.

In this way, by turning the adjusting screw 16, the user can increase or decrease the resilient bias applied by the leaf spring on an inserted lens group holder 11, thereby to allow the insertion of the lens group holder (when the collar applies the least force to the leaf spring) and then bias the lens group holder 11 against the carrier means 17 and thereby against the manipulator when the screw is tightened to move the collar towards the adjusting screw 16. In this way the user can selectively apply a resilient biassing force to an inserted lens group holder 11 by adjusting the screw 16.

In use of this arrangement, the manipulator system 10 would, for example, be secured to the housing of a laser by means of its flange 15, such that the laser beam from the laser will pass through the throughbore of the manipulator system 10. The lens group assembly 11 can then be inserted in the carrier of the manipulator system, such that the laser beam will then pass through the lenses 12, 13 in the holder 11. The lens group holder 22 can then have both its lateral and tilt adjustment within the manipulator system 10 adjusted by means of the adjustment screws 18, 19, and its rotational alignment fixed by using the separable collar for the carrier 17. Such adjustment will accordingly cause the laser beam to have, e.g., a particular pointing direction and shape when exiting the lens group assembly 11.

A typical alignment procedure for this arrangement is as follows.

The lens group assembly 11 and carrier 17 are first inserted into the manipulator 14 such that the flat lands on the surface of the carrier align with the adjustment screws 18, 19 of the manipulator. The resilient biassing adjustment screw 16 is then adjusted to resiliently bias the lens group assembly and carrier against the adjustment screws 18, 19.

The tilt of the lens group assembly 11 in the manipulator 14 would then typically be adjusted first, although this is not mandatory. The tilt is adjusted by moving the adjustment screws of one or other pair of screws 18, 18b or 19a, 19b while keeping the other pair of adjustment screws stationary. In this way the lens group assembly 11 is pivoted by the moving screws about the point held stationary by the stationary pair of screws. Each adjustment screw of the moving pair would usually be moved individually to tilt the lens group assembly in each plane separately. Thus, for example, the screw 18a could be moved while keeping the remaining screws stationary to tilt the lens group assembly in one plane about the screws 19a, 19b, and then the screw 18b moved while keeping the remaining screws stationary to tilt the lens group assembly in the orthogonal plane about the screws 19a, 19b.

Once the tilt alignment has been adjusted, the lateral alignment can then be set by displacing the lens group assembly 11 laterally in the plane perpendicular to the longitudinal axis of the manipulator 14 by moving the adjustment screws 18a, 19a and/or 18b, 19b together as pairs.

The tilt and lateral adjustments can be repeated as desired until the desired tilt and lateral alignment has been achieved.

Once the tilt and lateral alignment have been optimised, the lens group assembly 11 can be rotated about its longitudinal axis until the correct rotational orientation is achieved.

Once this orientation has been achieved the separable collar of the carrier 17 can be secured to the lens group assembly, thereby preventing further rotation of the lens group assembly relative to the carrier and thus the manipulator when the collar is properly mated with the carrier body.

This arrangement ensures that the lens group assembly 11 (together with the collar secured to it) can be removed and replaced without the need for realignment, since the same points will be in contact and the alignment preserved.

Figure 6:
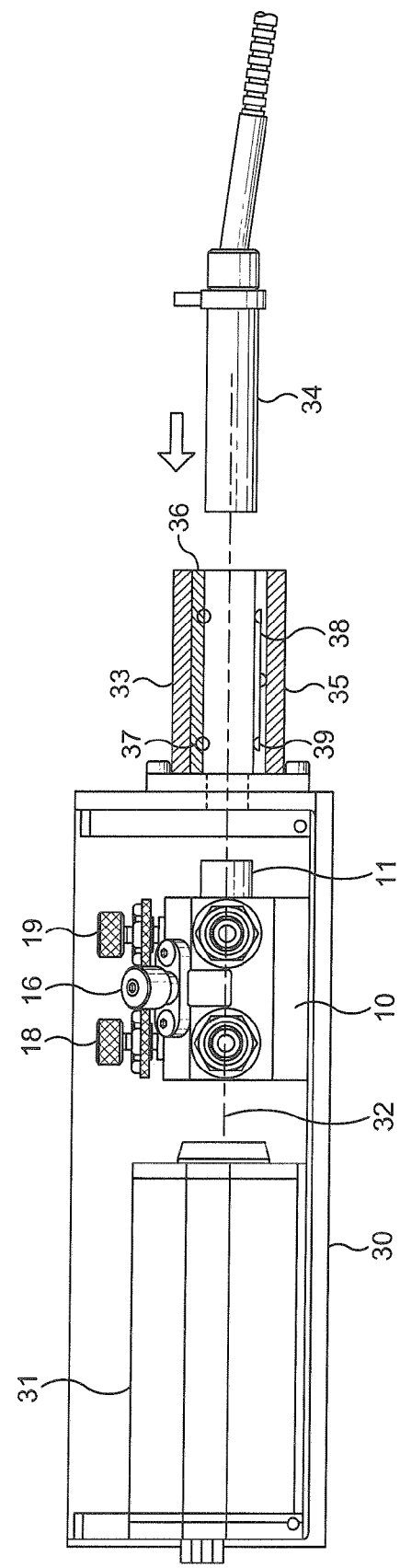
FIG. 6 shows an arrangement of a laser and a lens group arrangement.

FIG. 6 shows an arrangement which uses the manipulator system and lens group assembly arrangement of FIG. 5 to direct the beam from a laser into an optical fibre.

In FIG. 6, the manipulator system 10 together with its inserted lens group assembly 11 is mounted in a housing 30 that also contains a laser 31. The arrangement is such that the beam 32 exiting the laser passes through the manipulator system 10 and the lens group assembly 11, as shown in FIG. 6.

Mounted on the outer end face of the laser housing 30 is a connector 33 that can receive an optical fibre assembly 34 in use. The connector 33 is of a similar design to the connector described in the Applicant's earlier UK Patent No. 2325057.

Thus, the connector 33 comprises a hollow cylindrical body 35 having a throughbore. A hollow sleeve or carrier 36 in the form of a cylindrical tube having a throughbore fits snugly within the hollow body's throughbore. The sleeve 36 can receive and releasably retain an optical fibre assembly 34 which is to be optically coupled to the laser 31 by means of the connector 33.

While the outer body, sleeve and optical fibre assembly are shown as being in the form of cylindrical tubes in FIG. 6, it should be appreciated that they can have other geometries, if desired.

The optical fibre assembly 34 is shown in this embodiment as being a lens tube which carries an optical fibre and a lens. However, the optical fibre assembly is not restricted to such arrangements. It could, for example, comprise a cylinder mounting a different optical element and an optical fibre, a cylinder mounting an optical fibre alone, or simply the optical fibre on its own.

The sleeve 36 of the connector 33 accommodates a plurality of discrete individual engagement means in the form of balls 37 in holes around its circumference. The arrangement is such that the balls 37 are positioned in circumferentially spaced pairs at spaced intervals along the longitudinal axis of the connector 33 throughbore. Their longitudinal spacing is such that the optical fibre assembly engages two pairs of balls when properly inserted in the connector.

The balls 37 protrude through the holes in the sleeve 36 into the sleeve's throughbore. They are loosely held in place in the sleeve 36 such that they cannot move longitudinally along the sleeve, but are free to rotate as an optical fibre assembly moves past them and to float radially relative to the sleeve. The holes are sized such that the balls cannot fall out of the sleeve when an optical fibre assembly is removed.

The diameters of all the balls 36 are substantially identical and the diameter of the sleeve's throughbore is uniform along its length. This helps to prevent tilt of an inserted optical fibre assembly.

The optical fibre assembly 34 is biassed against the balls 36 and thereby against the inner surface of the connector body 35 by resilient biassing means in the form of a spring arrangement 38. The spring arrangement 38 comprises an elongate resilient strip spring plate having two contact means in the form of hemispheres 39 on the surface that faces the optical fibre assembly in use. The sleeve 36 has appropriate holes in its circumference to allow the hemispheres to protrude through the sleeve.

The spring arrangement 38 is pivoted about its midpoints by a pivot 40 which engages the inner surface of the connector's throughbore. In this arrangement, as an optical fibre assembly 34 is inserted into the carrier 36, the pivoting action of the spring prevents any force being applied by the spring on the assembly until ends of the assembly are in contact with the distal and proximal ends respectively of the spring.

This arrangement enables an optical fibre assembly to be inserted into and removed from the connector without the biassing force being applied. In this way, substantial wear on an assembly as it is inserted or removed can be avoided.

The connector 33 can also include a separable collar (not shown) which mates with the main body of the connector in a single orientation with respect to rotation about the longitudinal axis of the connector throughbore. To achieve this the collar can have a pin which engages in a corresponding slot on the connector body. The collar can further include means, such as a number of grub screws, to enable it to be secured to an optical fibre assembly. The collar allows the rotational orientation of an inserted optical fibre assembly with respect of the connector to be fixed. For example, the optical fibre assembly can be rotated about its longitudinal axis within the connector until the desired rotational orientation, such as when the polarisation axes are aligned, is achieved. Once this orientation has been achieved the collar can be secured to the optical fibre assembly, thereby ensuring correct rotational alignment of the optical fibre assembly relative to the connector when the collar is properly mated with the connector body thereafter.

In use, the optical fibre assembly 34 is inserted in the connector 33, such that it is biassed against the balls 36 and thereby against the hollow body of the connector 33. It should be noted that because of the spherical surfaces of the balls 33 and contact means 39, the engagement with the assembly is by point contacts, i.e. it is in accordance with the kinematic principle.

In this arrangement, the optical fibre assembly 34 is retained in the connector 33 in such a way that the tilt and optical alignment of the fibre assembly 34 cannot be adjusted, but rather is constrained to be always repeated to the same position (subject to any fixing of the rotational orientation of the assembly 34 in the connector 33).

The manipulator system 10 is used to adjust the position of the lens group holder and thereby lens group assembly 11 such that it will steer and shape the laser beam 32 in an appropriate manner for the beam to enter or pass through the connector 33 and thereby into the optical fibre assembly 34. In particular, the manipulator system 10 and lens group holder 11 arrangement can be adjusted (e.g. in the manner discussed above in relation to FIG. 5) to compensate for and trim out any pointing, etc. errors between the laser beam exiting the laser 31 and the position of the optical fibre assembly 34 when it is inserted in the connector 33.

Once this has been done, there is no need to be able to, or to, adjust the position of the optical fibre assembly 34 within the connector 33 to achieve correct alignment and coupling of the laser beam into the optical fibre. This allows the optical fibre assembly 34 to simply be plugged into the connector 33 without the user needing to be concerned about any adjustment of its position in use, and thus the arrangement provides a "plug and play" type system.

It can be seen from the above that the present invention, in its preferred embodiments at least, provides an arrangement whereby a beam of electromagnetic radiation, such as a laser beam, can be manipulated and steered, such that the size, shape and position of the beam can be adjusted, in a relatively straightforward manner. This is achieved by using a group of lenses that can be translated and tilted as a group relative to the radiation beam so as to move and adjust the beam.

This facilitates, for example, more straightforward replacement of a radiation source, such as a laser, in the field, and also the use of, for example, laser sources with optical fibres in a "plug and play" manner, i.e. without requiring complex or difficult end user adjustments, when, e.g., an optical fibre has to be removed and replaced or changed.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus for directing a laser beam towards a desired location, the apparatus comprising:
   a lens group holder comprising a hollow body having a longitudinally extending throughbore in which a group of lenses is mounted and through which the laser beam can pass, one of the lenses in the group of lenses being able to receive the laser beam and another lens of the group being able to output the laser beam; and
   a manipulator having a body having a throughbore adapted to receive the lens group holder containing the group of lenses, wherein the manipulator can be used to displace the lens group holder and thereby the group of lenses; and wherein:
   the lens group holder and manipulator are arranged such that the manipulator can be used to displace laterally the lens group holder and hence the group of lenses as a group relative to the laser beam when the lens group holder is inserted in the manipulator, and such that the manipulator can be used to tilt the lens group holder and hence the group of lenses as a group relative to the laser beam when the lens group holder is inserted in the manipulator; and
   the lens group holder is removably retained in the manipulator.

2. The apparatus of claim 1, further comprising:
   a radiation source for outputting a laser beam and having a housing; and
   a connector mounted to the housing of the radiation source and having a throughbore for receiving an optical component;
   the radiation source, manipulator, lens group holder and connector being arranged such that the radiation beam from the radiation source will pass through the group of lenses and then through the connector throughbore.

3. The apparatus of claim 1, further comprising an electromagnetic radiation source having a housing and wherein the manipulator is mounted to the housing of the radiation source such that a laser beam from the radiation source will pass through the manipulator throughbore.

4. The apparatus of claim 1, wherein the group of lenses comprises two and only two lenses.

5. The apparatus of claim 1, wherein the group of lenses is arranged to magnify or demagnify the laser beam.

6. The apparatus of claim 1, wherein the group of lenses is arranged so as to provide a collimated output beam or a convergent or divergent output beam.

7. The apparatus of claim 1, comprising:
   a radiation source for outputting a laser beam and having a housing; wherein:
   the manipulator is mounted to the housing of the radiation source such that the laser beam from the radiation source will pass through the manipulator throughbore; and
   the manipulator further includes one or more adjustment means which are adjustable to move the lens group holder when the lens group holder is inserted in the manipulator throughbore; and the apparatus farther comprises:
   a connector having a throughbore for receiving an optical component and mounted to the housing of the radiation source and arranged so as to receive the laser beam from the radiation source once the laser beam has passed through the manipulator throughbore.

8. The apparatus of claim 7, wherein the connector for receiving the optical component comprises a hollow body having a throughbore for receiving the optical component, one or more discrete engagement means against which an inserted optical component can be biassed, and biassing means for biassing an inserted optical component against the engagement means, the engagement means and biassing means being arranged such that an inserted optical component can be biassed against the engagement means in use in such a manner that the optical component only engages the body of the connector via the engagement means and the biassing means.

9. The apparatus of claim 1, wherein the manipulator further includes one or more adjustors which are adjustable by a user to move the lens group holder when the lens group holder is inserted in the manipulator throughbore.

10. The apparatus of claim 1, wherein the manipulator can move an inserted lens group holder in a direction perpendicular to a longitudinal axis of the manipulator, and/or adjust the tilt of the longitudinal axis of an inserted lens group holder relative to the longitudinal axis of the manipulator.

11. The apparatus of claim 1, wherein the manipulator is arranged such that one or more discrete rotational orientations of a lens group holder within the manipulator can be identified and arranged.

12. A method of directing a laser beam towards a desired location, comprising:
   passing the laser beam through a longitudinally extending throughbore of a lens group holder comprising a hollow body in which a group of lenses is mounted such that one of the lenses in the group of lenses receives the laser beam and another lens of the group outputs the laser beam; and
   using a manipulator having a body having a throughbore that receives the lens group holder to displace laterally the lens group holder and hence the group of lenses as a group relative to the laser beam or to both displace laterally the lens group holder and hence the group of lenses as a group relative to the laser beam and to tilt the lens group holder and hence the group of lenses as a group relative to the laser beam, thereby to redirect the laser beam as the laser beam exits the group of lenses.

13. The method of claim 12, wherein the manipulator includes:
   one or more adjustors which are adjustable by a user to move the lens group holder when inserted in the manipulator throughbore and to displace or tilt the lens group holder.

14. The method of claim 12, wherein the group of lenses is arranged to magnify or demagnify the laser beam.

15. The method of claim 12, wherein the group of lenses is arranged so as to provide a collimated output beam or a convergent or divergent output beam.

16. The method of claim 12, comprising:
   mounting a connector having a throughbore for receiving an optical component on or in the housing of a radiation source for outputting a laser beam; and arranging the lens group holder, the radiation source, and the connector such that the laser beam from the radiation source will pass through the lens group holder and then through the connector's throughbore.

17. The method of claim 12, further comprising:

mounting the manipulator to the housing of a radiation source for outputting a laser beam in such a manner that the laser beam from the radiation source will pass through the manipulator throughbore;

arranging the lens group holder in the throughbore of the manipulator;

mounting a connector having a throughbore for receiving an optical component on or in the housing of the radiation source so as to receive the laser beam from the radiation source once the laser beam has passed through the manipulator throughbore; and using the manipulator to move the lens group holder when the lens group holder is inserted in the manipulator throughbore.

18. The method of claim 12, comprising:

providing a radiation source for outputting a laser beam and having a housing;

mounting the manipulator to the housing of a radiation source such that the laser beam from the radiation source will pass through the manipulator throughbore;

arranging the lens group holder in the throughbore of the manipulator; and using the manipulator to move the lens group holder when the lens group holder is inserted in the manipulator means throughbore.

19. The method of claim 12, comprising using the manipulator to move an inserted lens group holder in a direction perpendicular to a longitudinal axis of the manipulator, and/or to adjust the tilt of the longitudinal axis of an inserted lens group holder relative to the longitudinal axis of the manipulator.

* * * * *